May 1, 1951  B. V. MILLER  2,551,331
MACHINE TOOL FOR MILLING TUBULAR WORKPIECES
Original Filed Oct. 22, 1948  5 Sheets-Sheet 5

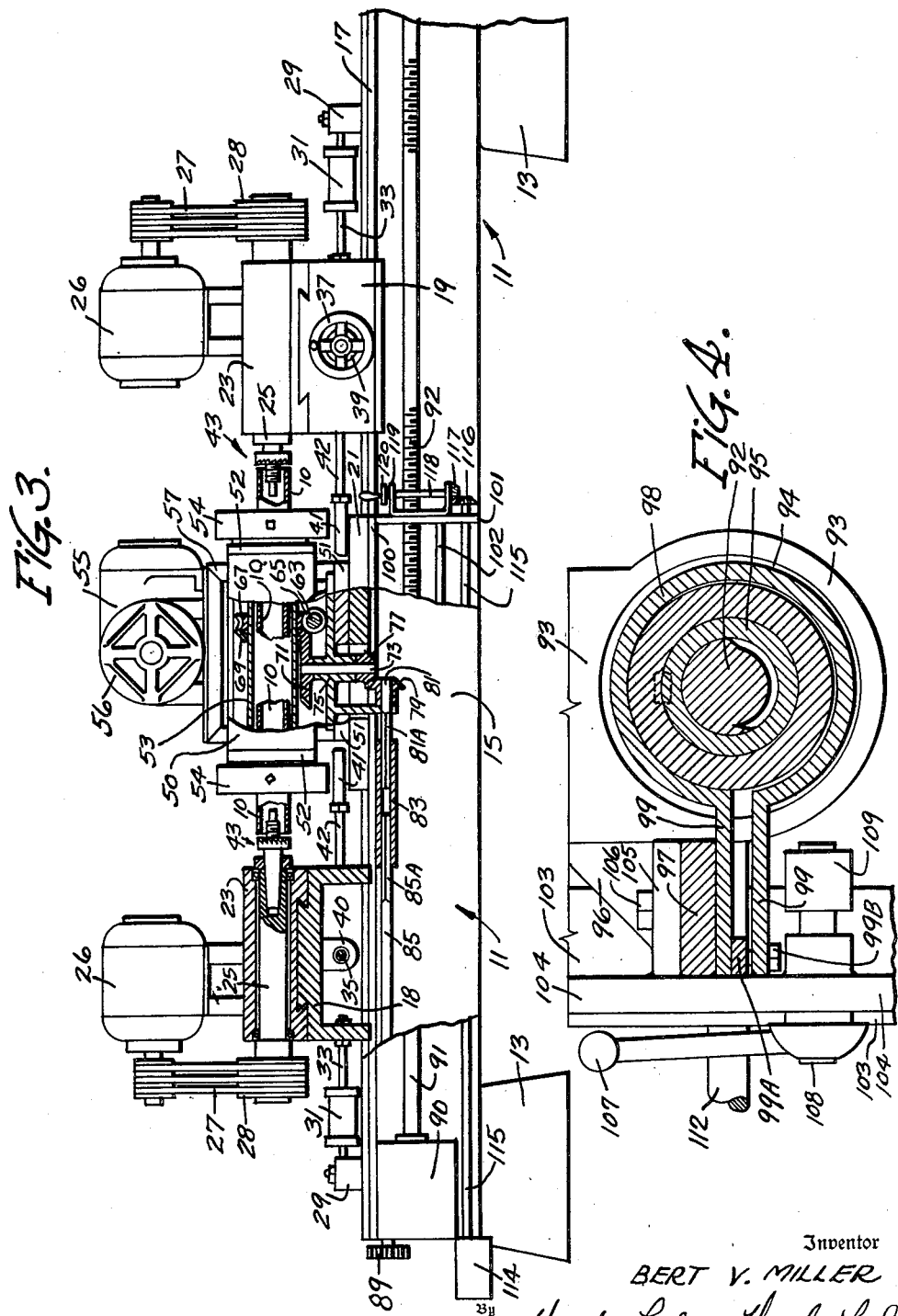

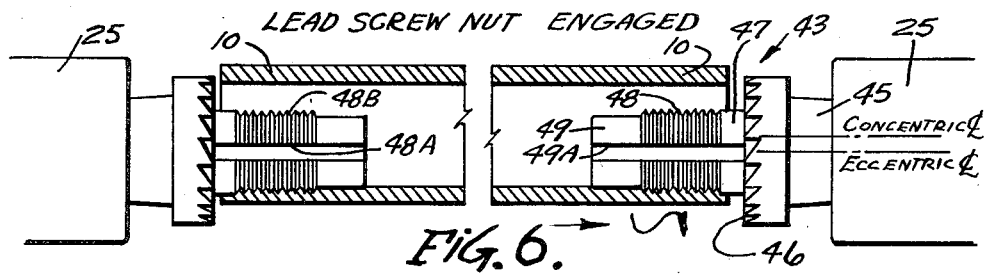
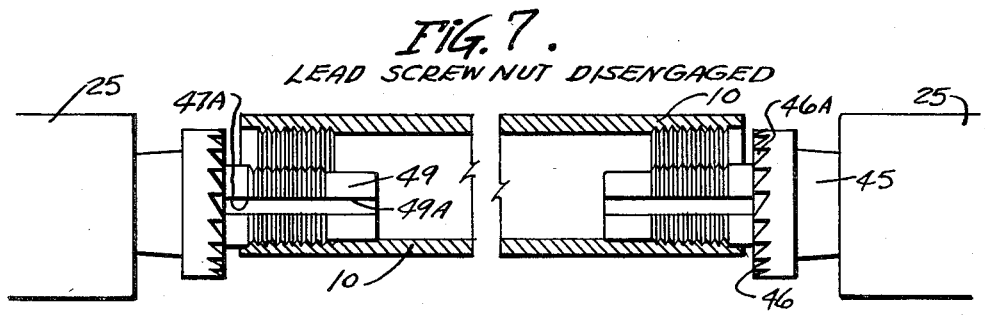
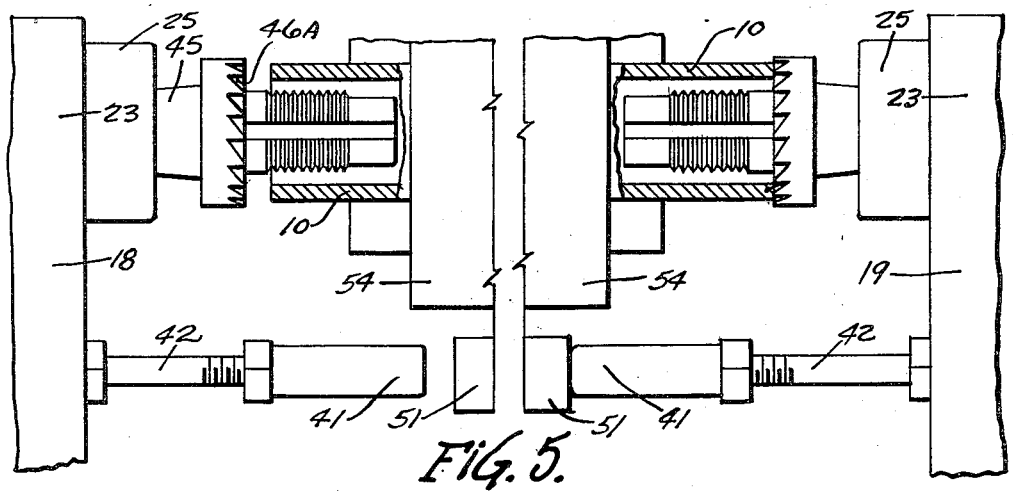
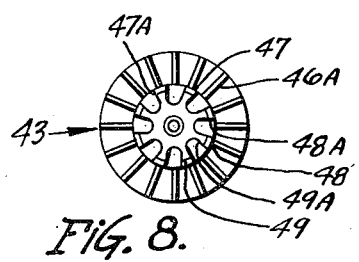

Inventor
BERT V. MILLER
By Weatherford and Weatherford
Attorneys

Patented May 1, 1951

2,551,331

UNITED STATES PATENT OFFICE 2,551,331

MACHINE TOOL FOR MILLING TUBULAR WORKPIECES

Bert V. Miller, Memphis, Tenn., assignor to Layne & Bowler, Incorporated, Memphis, Tenn., a corporation of Delaware Original application October 22, 1948, Serial No. 55,954, now Patent No. 2,526,762, dated October 24, 1950. Divided and this application November 5, 1949, Serial No. 125,762

7 Claims. (Cl. 90—11.44)

This invention relates to machines for processing cylindrical work pieces, such as tubing or pipe, and particularly relates to a machine adapted to face the opposite ends of such work piece and to mill threads therein, and is a division of my pending application for patent on a Machine Tool for Milling Tubular Work Pieces, Serial Number 55,954, filed October 22, 1948, now Patent No. 2,526,762 issued October 24, 1950.

It has long been considered desirable to mill the threads of cylindrical work pieces such as tubing or pipe because of the improved accuracy of threading formed by the milling process. It has also been recognized that it is desirable to concurrently form the threads on the opposite ends of such work piece, thereby insuring axial alinement of such threads.

Many attempts have been heretofore made to accommplish such desired threading, but the means by which such result has been attempted to be accomplished have primarily been unsatisfactory because of their incorporation of an undesirable number of mechanisms, and because of their inability to perform the function for which designed, through inaccuracies in coordination.

The machines heretofore devised have essentially been provided for accomplishing concurrent threading of the opposite ends of the work piece by mounting the work piece for revolution in a position fixed against longitudinal movement relative to the machine and have employed machine elements carrying threaded tools or hobs positioned eccentrically of the work piece in cutting engagement with one side of the periphery thereof and mounted for longitudinal shift relative to the work piece as the revolution of the work piece has progressed. As will readily be seen, when concurrent threading of the opposite ends of the work piece has been undertaken it has been necessary to employ two cutters and to concurrently shift the two cutters during the revolution of the work piece, resulting in an excess of mechanism, and requiring an accurate coordination which has not been achieved.

The present invention is designed to simplify the means by which concurrent threading of the opposite ends of a work piece may be accomplished and to accurately coordinate the elements of the machine, and in general differs from the machines known in the art in providing for longitudinal movement of the work piece during revolution thereof, such longitudinal work-piece shift being accomplished relative to the fixed cutting position of the spaced tools and in coordination with the aforesaid revolution. In accomplishing this object the present invention makes use of a new and novel work holder means by which the work piece revolution is accomplished, and shift of the work piece accurately coordinated with the work revolution, is effected.

This divisional application relates particularly to stop means by which approach of the work carriage to the tools, or of the tools to the work carriage, is limited, and to means in connection therewith by which displacement of the tools is allowed should overtravel of the work carriage toward the tools, or overtravel of the tools toward the work carriage, occur.

The principal object is to provide in a machine tool assembly, which includes a pair of tool holders adjustable longitudinally and transversely of the machine and rotatable in a fixed position, and a longitudinally shiftable work holder which includes means for holding and revolving a work piece and means coordinated with such revolution for gradually longitudinally shifting said work piece a predetermined limited distance relative to said tool holders, means for limiting the relative approach of the work holder and the tool holders;

To provide a longitudinally shiftable work holding carriage, cooperative tool holding carriages longitudinally adjustable toward and away from said work carriage, means for displaceably holding said tool carriages in adjusted positions, and means for limiting relative approach of said work carriage to said tool carriages;

To provide a longitudinally shiftable work holding carriage, cooperative longitudinally shiftable tool holding carriages, adjustable means for limiting relative approach of said work carriage to said tool carriages, means for advancing said tool carriages toward said work carriage and yieldably holding said tool carriages in said advanced positions; and A further object of the invention is to generally improve the design, operation and efficiency of machine tools, particularly those adapted to process cylindrical work pieces.

The means by which the foregoing and other objects of this invention are accomplished and the manner of their accomplishment will readily be understood from the following specification upon reference to the accompanying drawings, in which:

Fig. 3 is a side view, partly in elevation and partly in section, showing further details of the arrangement of the parts of the present invention.

Fig. 4 is an enlarged sectional elevation taken on the line IV—IV of Fig. 2 showing detail of the lead screw nut clamping parts.

Fig. 5 is a schematic elevational view showing the relative positioning of the work and the facing portion of the threading hobs, as facing of one end of the work piece is completed and the related stop limits further facing action.

Fig. 6 is a schematic sectional plan view showing the relative positioning of the threading hobs and the work as the threading operation begins.

Fig. 7 is a companion view showing relative positioning at the completion of the threading operation.

Fig. 8 is an end elevation of the threading and facing hobs; and

Figure 1:
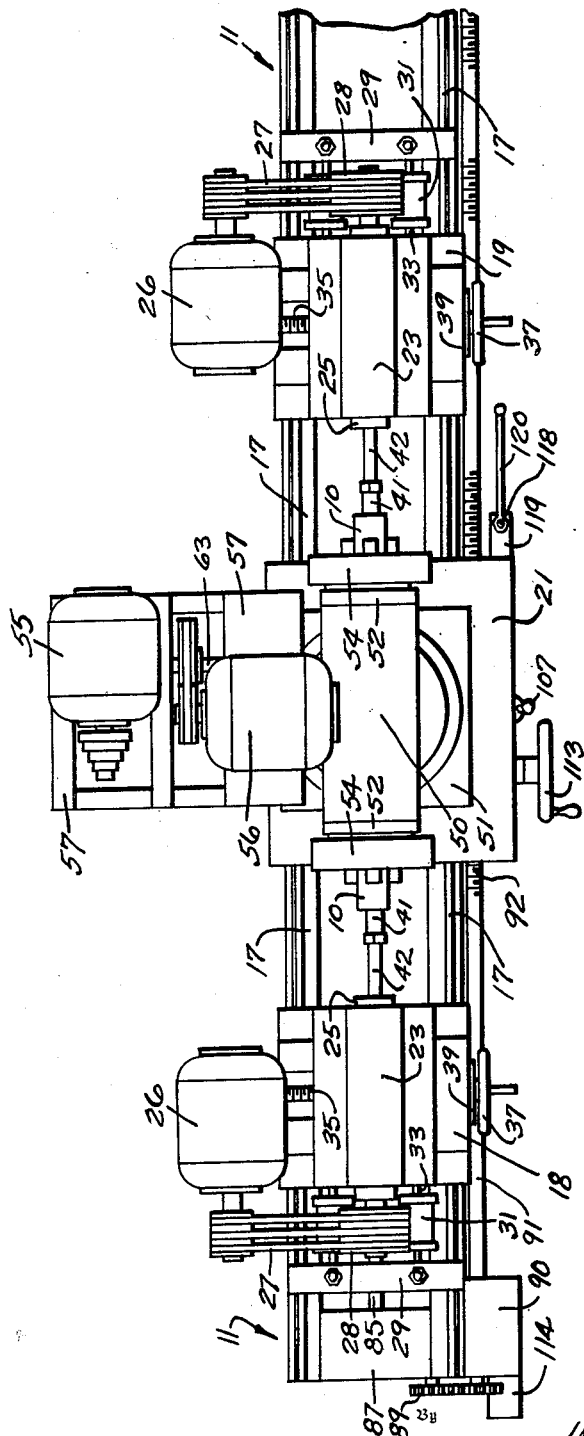
Fig. 1 is a top plan view of the machine tool of the present invention with an end portion at the right of the drawing omitted.
Figure 2:
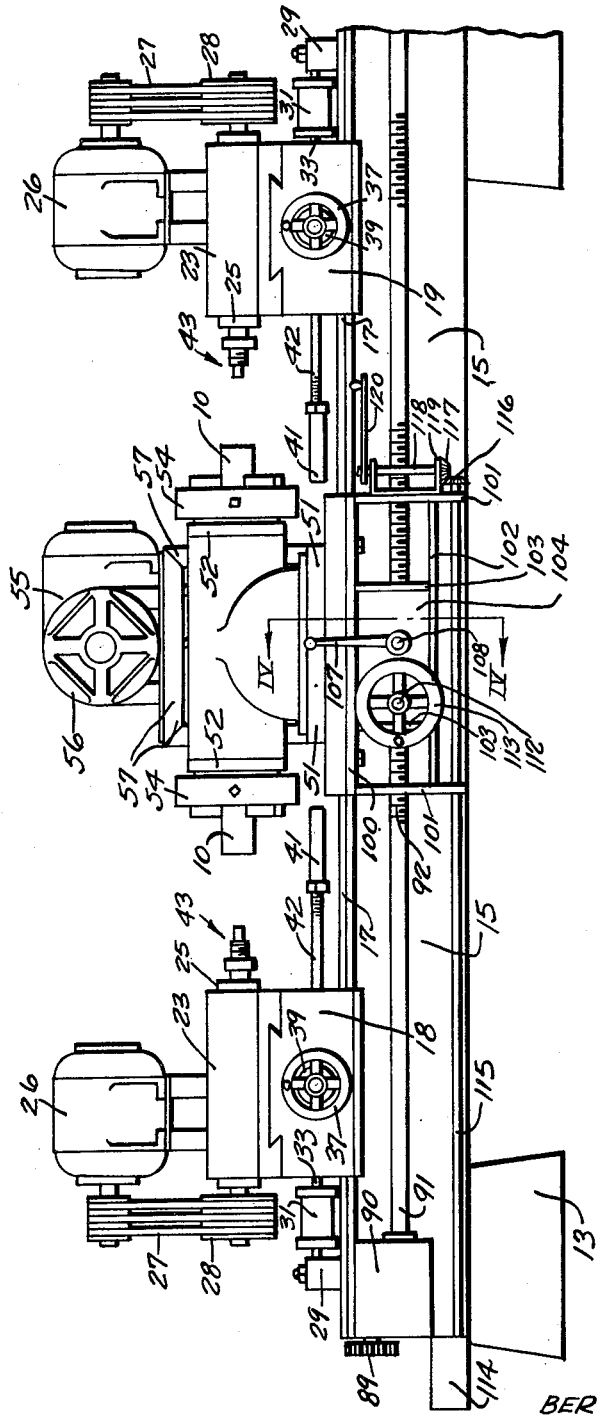
Fig. 2 is a side elevational view of the arrangement shown in Fig. 1.
Figure 9:
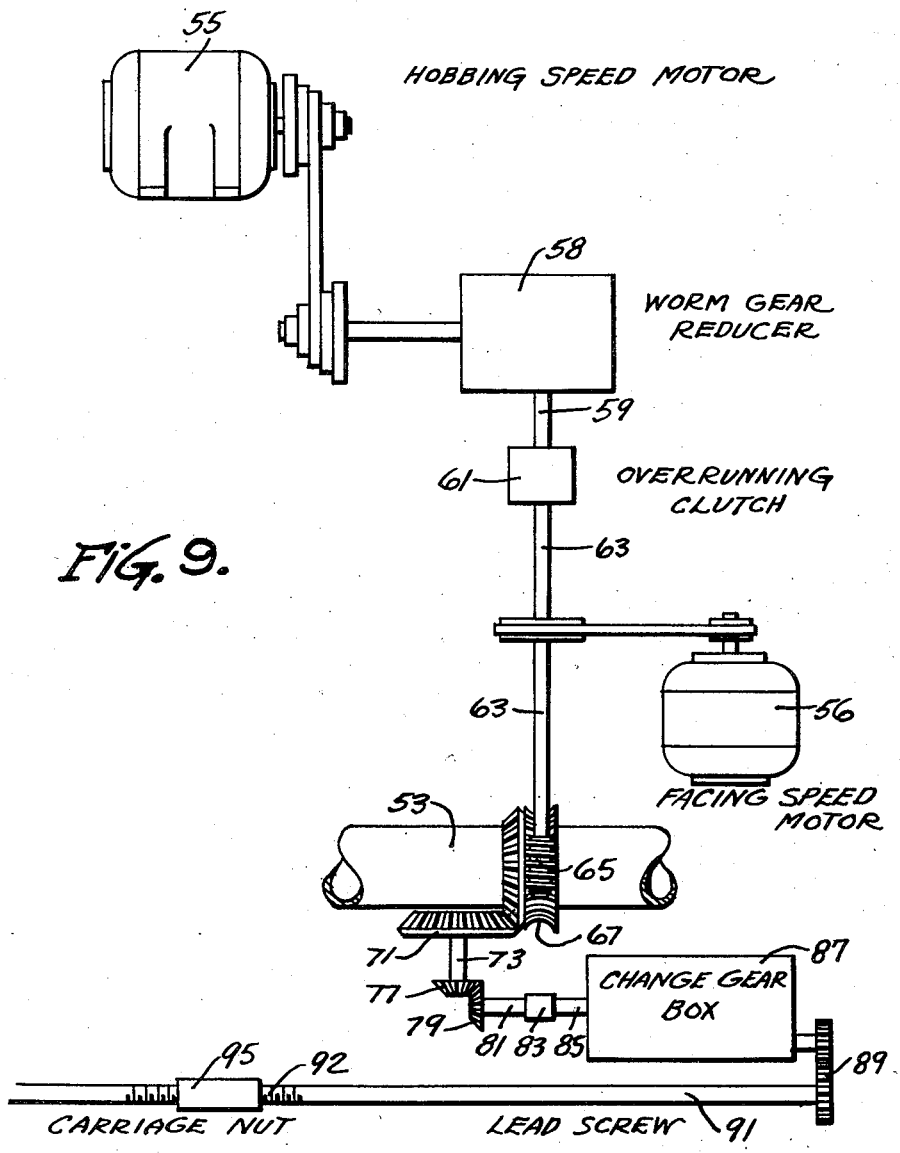
Fig. 9 is a schematic drive diagram illustrating the operation of the present invention.

Referring now to the drawings in which the various parts are indicated by numerals:

The machine illustrated is one which is particularly adapted for milling a cylindrical work piece as the tubing 10 and is so arranged that the ends of the tubing may be faced by the machine and subsequently the opposite ends of the tubing simultaneously threaded, the threading through the arrangement of the present invention being in axial alinement.

The machine primarily consists of a bed 11 which may be supported upon suitable supports 13, upon which bed the various elements of the present machine are mounted and supported. The bed includes side walls 15 which at their upper ends carry ways 17, the ways being also disposed longitudinally of the machine and being adapted to have slidably mounted thereon the carriages for the various elements of the machine.

Adjacent the opposite ends of the bed, tool carriages 18, 19 are mounted slidably upon the ways 17 and are adapted for longitudinal movement along the ways for adjustment of the relative positions of the carriages and the tools carried thereby upon the machine. Intermediate the tool carriages 18, 19 a work carriage 21 is mounted slidably upon the ways 17. In general, the work piece 10 to be processed is handled by the mechanisms associated with the work carriage and the processing tools are associated with the tool carriages.

The tool carriages 18, 19 and the elements associated therewith are substantially identical and accordingly description of one of the carriages and its associated elements is deemed sufficient to describe the operation of both.

Mounted on each tool carriage for movement transversely of the machine is a head 23, upon which head a spindle 25, axially parallel with the longitudinal center line of the machine, is mounted for rotation. A motor 26 is mounted upon the carriage and is coupled to the spindle 25 by belts 27 and pulleys 28 to effect rotative drive of the spindle. It will be understood that the motor and coupling illustrated is a preferred form of drive for the spindles, but that any suitable means for rotating the spindles may be employed if desired. It also is preferred that the motors be controlled by a single control, although obviously separate controls may be employed if desired.

Positioning of the tool carriages on the ways 17 is maintained by clamps 29, each of the carriages being coupled to a clamp 29 by hydraulic cylinder and piston means which include cylinders 31 and projecting piston rods 33, the cylinders being in communication with a suitable source of fluid pressure, not shown. The projecting end of each of the piston rods is attached to its related tool carriage and the opposite end of each of the cylinders is anchored to its related clamp 29. The clamps 29 are preferably removably fixed to the bed 11, as by bolts or other suitable means, such removable attachment enabling the use of the machine for work pieces of various lengths.

Movement of the tool heads 23 transverse the machine is accomplished by cross feed screws 35 which are preferably provided with hand wheels 37 and which also each preferably have a suitable calibrated gage or dial and indicater 39 associated therewith for the accurate determination of the amount of transverse movement of the tool heads. The cross feed screws 35 each threadedly engage a head nut 40 on each of the heads 23 to accomplish the transverse movement in substantially conventional manner. At its inner end opposite to the attachment of piston rods 33 each of the tool carriages is provided with a forwardly projecting stop member 41 adjustably threaded on a threaded rod member 42 rigidly attached to the tool carriage.

Mounted co-axially with the spindles 25 for rotation thereby are the cutter tools 43. Each of the cutter tools is preferably provided with a shank 45 adapted to engage the socket (not shown) of spindle 25 and to be fixed therein in suitable manner. As will be seen from Figs. 4, 5 and 6, the preferred form of cutter tool 43 is a four zone tool including a facing zone 46, an undercutting zone 47, a threading zone 48, and a blanking zone 49. It will be seen that in its preferred form the blanking zone 49 is fluted as at 49A and has the general characteristics of a blanking mill; that the threading zone 48 is essentially a multiple ring tooth cutter section, fluted as at 48A and serrated between the flutes at 48B, the threading section having no lead or pitch and in general having the characteristics of a thread mill or hob. It will also be noted that the outside diameter of the blanking zone 49 is substantially equal to the tool diameter at the root of the thread serrations. The undercutting zone 47 is fluted as at 47A and is of the same general characteristics as the blanking zone 49, except that it will be noted that the outside diameter of the undercutting zone is substantially equal to the outside diameter of the threading zone. It will be noted also that the diameter of the facing zone 46 is substantially equal to, or very slightly greater than, the diameter of the work piece to be processed by the machine and is considerably in excess of the diameter of the blanking, threading and undercutting zones. The facing zone is toothed as at 46A, to give it the general characteristics of a facing mill.

Mounted upon the work carriage 21 is a housing 50 having an integral base 51 which is seated on and rigidly secured to the work carriage 21. Carried by the housing 50 are longitudinally spaced thrust bearings 52, in which a hollow spindle 53 is journalled for rotation. The spindle 53 is provided at its opposite ends with suitable work holding means, as chucks 54, and is axially alined with the longitudinal center lines of the machine and adapted to receive and hold the work piece 10 for processing by the machine. Rotation of the work spindle 53 and work piece carried thereby is accomplished preferably by motors 55, 56, mounted on the upper portion of a platform 57 rigidly secured to and supported from the work carriage 21. The motor 55 is preferably coupled by suitable belt and pulleys to a worm gear reducer 58, preferably mounted on a lower portion of platform 57, by which reducer the motor speed is reduced and through which drive of a shaft 59 by the motor is accomplished. The shaft 59 is coupled by an overrunning clutch 61 to the main shaft 63, which main shaft is provided at its forward end with a worm 65. Engaged by the worm 65 is a worm wheel 67 surrounding and keyed to the spindle 53, so that upon rotation of the shaft 63 and of the worm 65 carried thereby rotation of the work spindle 53 is accomplished. Through this arrangement the motor 55 is enabled to rotatively drive the spindle 53 at an extremely low speed which is preferably in the nature of one R. P. M., and which speed is preferably employed in connection with the concurrent processing of the opposite ends of the work piece 10 by the threading, blanking and undercutting zones of the tools 43. The rate of speed is determined by the material and the diameter of the work piece to be processed.

It is preferred that the motor 56 be provided to drive the work spindle 53 at a greater speed for processing of the work piece by the facing mill zone 46 of the tools 43. The motor 56 is coupled by suitable belt and pulleys to the shaft 63 forwardly of the overrunning clutch 61 and is adapted upon operation to effect rotation of the spindle 53 at a speed substantially in excess of that drive from the motor 55. It will be noted that by the coupling of the motor 53 to the shaft 63 forwardly of the overrunning clutch 61 the coupling between the shafts 59 and 63 is not effected during operation of the motor 56.

Surrounding and keyed to the spindle 53, preferably adjacent the worm wheel 67, for rotation with the spindle is a bevel gear 69. Drivingly engaged by the bevel gear 69 is a second bevel gear 71 carried by the upper end of a stub shaft 73, the stub shaft 73 being journalled in a suitable bearing 75 carried by the housing 50. Below and exterior the housing 50 the stub shaft 73 carries at its opposite end a small bevel gear 77 which drivingly engages a similar small bevel gear 79 carried by one end of a shaft 81.

The opposite end of the shaft 81 is longitudinally slidable in a sleeve 83. In the embodiment shown, it will be seen that the shaft 81 is squared as at 81A, the interior of the sleeve 83 being of similar interior shape and being engaged by the portion 81A to insure rotation of the sleeve 83 with the shaft 81. It will be understood that the sleeve 83 may be splined to the shaft 81 or otherwise secured for rotation while permitting longitudinal sliding therewith in other suitable manner.

Similarly engaged by the opposite end of the sleeve 83 is one end of a shaft 85, which, as shown, is preferably square as at 85A to engage the interior of the sleeve 83 for rotation therewith and to be longitudinally slidable relative thereto.

It will be seen that the bevel gears 69, 71 are substantially equal in size and that the small bevel gears 77, 79 are also of substantially the same size, so that the rotation of shaft 85 is in equal ratio to the speed of revolution of the work spindle 53. The shaft 85 extends into a change gear box 87 by which the shaft 85 is coupled to gear train 89 and through gear train 89, and suitable gearing 90 to a longitudinally extending lead screw 91, which has an extended threaded portion 92 intermediate its length. Through the change gear box the speed imparted to the shaft 85 is further reduced or controlled in desired manner so that the revolution of the lead screw 91 is exactly coordinated to the speed of the work spindle revolution. Lead screw 91 is supported by and coupled into the gearing 90 at one end of the machine, and is journalled in a suitable bearing (not shown) attached to the opposite end of the machine.

A pair of depending brackets 93 are rigidly secured, as by suitable bolting, to the underside of the work carriage 21, adjacent its forward edge, but spaced rearwardly therefrom. The brackets 93 are longitudinally spaced apart and carry adjacent their lower ends thrust bearings 94 in which a carriage nut 95 is journalled. Carriage nut 95 is interiorly threaded and threadedly engages the threaded portion 92 of the lead screw 91. Integral with the brackets 93 are braces 96 which are connected by an integral cross member 97.

Surrounding the carriage nut 95 between the brackets 93 is a tube 98 which is adapted to engage the carriage nut and effect carriage movement thereby responsive to lead screw revolution. The tube 98 is provided with forwardly projecting lips 99 which underlie the cross member 97. The tube 98 is resilient, the resiliency urging the lips 99 to separate and upon separation of the lips the carriage nut 95 may turn freely within the tube 98 while closing of the lips effects clamping of the carriage nut by the tube to prevent independent nut rotation.

Preferably the upper lip 99 is provided with an integral pad 99A which is contacted by the lower lip during clamping to insure a more solid seat. It is also preferred that separation of the lips be limited and for that purpose an adjustable limit, as screw 99B is provided, extending loosely through a suitable aperture in the lower lip into threaded engagement with the upper lip or its pad. It will be seen that the lead of the screw is spaced from the upper lip sufficiently to permit opening of the lips to disengage the tube 98 from carriage nut 95.

When nut rotation is prevented by tube engagement, revolution of the lead screw will cause the nut to advance longitudinally thereof, and it will be seen that rotation of the nut at a speed in excess of the speed of lead screw revolution may be employed to advance the nut in the direction of the lead of the screw, while advancement in the opposite direction may be effected by overriding the lead screw revolution. Both the latter nut movements may be effected through the controls employed herein. Support and mounting of these controls and of the means for effecting closure of the tube lips 99 are provided by a frame work which consists of an upper horizontal bar 100, which is rigidly attached to the underside of work carriage 21, and extends longitudinally thereof abutting the forward edges of brackets 93. Integrated as by welding with the upper bar 100 are vertical end bars 101 which depend from the upper bar. A lower bar member 102 spans between the vertical bars 101 and is preferably secured thereto at its opposite ends as by welding, the opposite points of securing being preferably spaced above the lower ends of the vertical bars. Seated on and rigidly secured to the lower bar 102 are intermediate vertical members 103 which extend upward to the upper bar 100 and are rigidly secured thereto. Extending between the upper and lower bars 100, 102, and from one intermediate bar 103 to the other and rigidly secured to each of the bars is a plate 104, which is provided with an inwardly extending ear 105 secured as by bolt 106 to the cross member 97.

Control of the closure of lips 99 is effected through a hand lever 107 carried exterior the cover plate 104, which is rigidly secured to the outer end of a stub shaft 108. Shaft 108 is journalled in a suitable bearing in plate 104 and at its inner end has a cam 109 rigidly secured thereto in eccentric relation. The cam 109 underlies the lips 99, as shown in Fig. 4, the lower lip not being engaged by the cam and being urged by the resiliency of the tube to move away from the upper lip, freeing the carriage nut 95 from engagement by the tube 98.

When the hand lever 107 is depressed substantially to a horizontal position the cam 109 is moved into engagement with the lower lip 99, moving that lip toward closed position and effecting engagement by the interior of the tube 98 with the exterior of the carriage nut 95, holding the tube clamped in this engagement. It will thus be seen that upon rotation of the lead screw 91 in coordination with the revolution of the work spindle 53, the carriage nut 95 in threaded engagement with the lead screw will turn freely with the lead screw so long as the tube 98 remains out of clamping engagement with the carriage nut. When the hand lever 107 is depressed and the cam 109 moved into engagement with the lips of the tube 98, the carriage nut is held against rotation with the lead screw and drive of the lead screw by the work spindle will consequently effect advancement of the carriage nut thereon, such advancement carrying with it the work carriage 21 and the instrumentalities associated therewith.

Keyed to the carriage nut 95 beyond the right hand bracket 93 is a first bevel gear, not shown, with which a second bevel gear, not shown, is engaged. The second bevel gear is carried by the inner end of a shaft 112, also suitably journalled in and extending through plate 104, to the outer end of which shaft a control, as a suitable hand wheel 113, is attached. Through the means of the hand wheel and the interengaged bevel gears, manual longitudinal movement of the work carriage may be accomplished, rotation of the first bevel gear effecting rotation of the second bevel gear and consequently rotation of the carriage nut 95. Through the employment of this manual means the work carriage may be longitudinally shifted whether the lead screw is in revolution or at a standstill, as described above.

Selective operation of motors 55, 56 is accomplished through a suitable rotary switch housed in a switch box 114 and electrically connected to the respective motors. A contact arm, not shown, is mounted within the switch box and is attached to one end of an elongated rod 115. Intermediate its length rod 115 is journalled in and supported by the lower extension of end bars 101, and carries at its opposite end a bevel gear 116 which is engaged by a similar bevel gear 117 carried by a short control rod 118. The control rod is suitably journalled in the projecting legs of a U-shaped bracket 119, rigidly attached preferably to the right hand end bars 101. A control lever 120 is attached to the upper end of control rod 118. It will be seen that movement of lever 120 will rotate rod 118 and gear 117, effecting equal rotation of gear 116 and switch rod 115, the switch contact arm being swung thereby from one contact to another as desired.

In the operation of the device, the tool carriages 18, 19 are positioned on the ways 17 and spaced apart a distance to accommodate the length of the work piece to be processed thereby, with the piston rods 33 respectively fully extended from their cylinders 31. When so positioned the clamps 29 are rigidly attached to the bed 11, thus anchoring the tool carriages at their extreme inward position of longitudinal movement and the threaded stops 41 adjusted on their rods 42 to establish a space between the stops determined by the desired finished length of the work piece. The piston rods 33 may then be retracted moving the tool carriages longitudinally outwardly. The heads 23 are moved transversely rearwardly of the machine by the cross feed screws 35, clearing the work spindle 53 for the insertion of the work piece 10 therein. The work piece 10 is inserted in the spindle and engaged by the chucks 54, the tool carriages are returned transversely of the machine to bring the tool spindles 25 and the tools 43 carried thereby into axial alinement with the work piece 10. In the embodiment shown, the facing zone 46 of each of the tools 43 is thus alined for milling the opposite ends of the work piece 10.

The tool motors 26 are energized, rapidly rotating the cutter tools 43 at cutting speed. The motor 56 may then be energized through the operation of switch control 120 beginning revolution of the work spindle 53 through the drive hereinabove described and the work carriage 21 manually shifted through the operation of the hand wheel 113 to bring one end of the work piece 10 into engagement with the facing zone of one of the cutters 43. It will be noted that the stop 41 is in alinement with the base 51 of the work carriage, so that excess shift of the carriage beyond the desired distance will cause abutment of the stop by the base, preventing any damage to the work piece or to the tool by maintaining the spacing established. If any further excess shift is attempted the entire tool carriage is moved therewith against the effect of the associated cylinder and piston 31. Preferably this initial position is that illustrated in Fig. 5 of the drawings in which the work carriage 21 has been shifted to the right to bring the end of the work piece into engagement with the facing zone of the cutter. When facing one end of the work piece has thus been accomplished the work carriage is, through operation of hand wheel 113, manually shifted in the opposite direction to bring the opposite end of the work piece 10 into facing contact with the opposite tool 43.

When the end facing of the work piece has been completed the tool carriage is minutely backed off manually to the position shown in Fig. 6 in which the work piece is just clear of the facing zone 46 of the left hand tool 43 and out of contact therewith.

The motor 56 is deenergized and low speed motor 55 is energized through the selective control 120 to drive the work spindle 53 at the low speed hereinabove described. When the low speed motor has taken over the drive of the work spindle, the hand lever 107 is depressed moving the cam 109 into engagement with the lower lip 99 and effecting clamping by the tube 98 of the carriage nut 95. The tool heads 23 are shifted forwardly by the operation of the cross feed screws 35, thus moving the tools 43 to a position eccentric of the work piece 10 and bringing the undercutting, threading and blanking zones 47, 48, 49 into cutting engagement with the interior of the work piece 10, this transverse movement being continued until the tools are moved in to the full depth of cut desired. The amount of this latter transverse shift of the tool heads may readily be accurately determined from the gage 39.

The three zones 47, 48, 49 of each of the tools simultaneously operate upon the work piece and during such operation are rotated in a fixed position. While the tools are being rapidly rotated, the work piece 10 is revolved, as previously described, such revolution, through gears 69, 71, 75, 77, shafts 81, 85, change gearing 87, and gear train 89 effects coordinated revolution of lead screw 91. The work carriage nut 95 is held against rotation by the clamped tube 98 and through the engagement of the nut, with the lead screw 91 the work carriage and work piece carried thereby are moved steadily along the bed longitudinally of the machine, in the present instance being shown as moved from left to right. Through the coordination of the lead screw drive with the work spindle revolution the work carriage is moved a distance equal to the lead of the thread desired during one revolution of the work spindle so that a complete helical thread having the desired lead is simultaneously formed in the opposite ends of the work piece.

As the threading operation is accomplished the blanking zones 49 form a milled finish surface inwardly of the threaded zones of the work piece and the undercutting zones 47 form a suitable undercut zone adjacent the ends of the work piece. When the processing operation has been completed the tool heads 23 are moved transversely a minor distance until the tools are clear of the work piece, at which time the tool carriages 18, 19 may be retracted by the cylinders 31 and piston rods 33, moving the tools out of the work piece. The tool carriages may then be again moved transversely of the machine rearwardly and the work piece removed from the work spindle.

It will be understood that when processing of larger or longer work pieces is desired adjustment of the spacing of the carriages in the manner described may be made. When a work piece of excessive length is to be handled suitable steady rests may be employed for support of the work piece intermediate the tools and the work spindle.

I claim:

1. In a machine which includes a bed, a work carriage shiftable longitudinally of said bed and means for effecting said longitudinal shift, a tool carriage slidably mounted on said bed, hydraulic means yieldably anchoring said tool carriage in operating position on said bed, and a stop member adjustably attached to said tool carriage and projecting toward said work carriage in alinement therewith, said stop member being adapted to abut said work carriage during work carriage shift toward said tool carriage to maintain spacing between said carriages.

2. In a machine which includes a bed, a work carriage shiftable longitudinally of said bed and means for effecting said longitudinal shift, a tool carriage slidably mounted on said bed, means yieldably anchoring said tool carriage in operating position on said bed, and a stop member adjustably attached to said tool carriage and projecting toward said work carriage in alinement therewith, said stop member being adapted to abut said work carriage during work carriage shift toward said tool carriage to maintain spacing between said carriages.

3. In a machine which includes a bed, a work carriage shiftable longitudinally of said bed and means for effecting said longitudinal shift, a tool carriage slidably mounted on said bed, means yieldably anchoring said tool carriage in operating position on said bed, and a stop member attaching to said tool carriage and projecting toward said work carriage in alinement therewith, said stop member being adapted to abut said work carriage during work carriage shift toward said tool carriage to maintain spacing between said carriages.

4. In a machine which includes a bed, a work carriage shiftable longitudinally of said bed, and means for effecting said longitudinal shift, a tool carriage slidably mounted on said bed, a shiftable clamp rigidly secured to said bed, hydraulic cylinder-piston means interposed between said tool carriage and said clamp and oppositely secured to said tool carriage and said clamp, yieldably anchoring said tool carriage in operating position on said bed, and a stop member attached to said tool carriage and projecting toward said work carriage in alinement therewith, said stop member being adapted to abut said work carriage during work carriage shift toward said tool carriage to maintain spacing between said carriages.

5. In a machine which includes a bed, a work carriage shiftable longitudinally of said bed and means for effecting said longitudinal shift, a tool carriage slidably mounted on said bed, a shiftable clamp rigidly secured to said bed, yieldable means interposed between said tool carriage and said clamp and oppositely secured to said tool carriage and said clamp, yieldably anchoring said tool carriage in operating position on said bed, and a stop member attached to said tool carriage and projecting toward said work carriage in alinement therewith, said stop member being adapted to abut said work carriage during work carriage shift toward said tool carriage to maintain spacing between said carriages.

6. In a machine which includes a bed, a pair of tool carriages spaced apart and slidably secured on said bed, a work carriage mounted on said bed between said tool carriages and shiftable longitudinally of said bed toward and away from said tool carriages, and means for effecting said longitudinal shift, anchoring means for each respectively of said tool carriages rigidly secured to said bed, hydraulic cylinder-piston means, each respectively operatively coupling a said tool carriage to its related said anchoring means, stop members adjustably attached each respectively to a said tool carriage and projecting toward said work carriage in alinement therewith, said stop members being adapted to abut said work carriage during work carriage shift toward said tool carriage to maintain spacing between said carriages.

7. In a machine which includes a bed, tool carriage means slidably secured on said bed, a work carriage mounted on said bed and shiftable longitudinally of said bed toward and away from said tool carriage means, and means for effecting said longitudinal shift, anchoring means for said tool carriage means, and yieldable means, operatively coupling said tool carriage means to said anchoring means.

BERT V. MILLER.

REFERENCES CITED

The following references are of record in the file of this patent:

UNITED STATES PATENTS

| Number | Name | Date |
|---|---|---|
| 779,251 | Baggaley | Jan. 3, 1905 |
| 863,681 | Warner | Aug. 20, 1907 |
| 1,340,811 | Ballman | May 18, 1920 |
| 1,978,879 | Ferris et al. | Oct. 30, 1934 |
| 2,321,822 | Kendis | June 15, 1943 |
| 2,346,516 | Steinle et al. | Apr. 11, 1944 |